United States Patent
Taira (10) Patent No.: US 10,148,831 B2
(45) Date of Patent: Dec. 4, 2018

(54) INFORMATION PROCESSING EQUIPMENT

(71) Applicant: Konica Minolta, Inc., Chiyoda-ku, Tokyo (JP)

(72) Inventor: Ryutaro Taira, Okazaki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/926,384

(22) Filed: Mar. 20, 2018

(65) Prior Publication Data

US 2018/0278761 A1    Sep. 27, 2018

(30) Foreign Application Priority Data

Mar. 21, 2017  (JP) ................. 2017-054346

(51) Int. Cl.
*H04N 1/00* (2006.01)

(52) U.S. Cl.
CPC ..... *H04N 1/00241* (2013.01); *H04N 1/00538* (2013.01); *H04N 1/00543* (2013.01); *H04N 1/00551* (2013.01); *H04N 1/00917* (2013.01); *H04N 1/00981* (2013.01); *H04N 2201/0034* (2013.01); *H04N 2201/0081* (2013.01)

(58) Field of Classification Search
CPC .......... H04N 1/00241; H04N 1/00981; H04N 1/00538; H04N 1/00551; H04N 1/00917; H04N 1/00543; H04N 2201/0081; H04N 2201/0034
USPC ...................................... 358/1.15
See application file for complete search history.

(56) References Cited

U.S. PATENT DOCUMENTS

| | | | | |
|---|---|---|---|---|
| 7,903,269 B2 * | 3/2011 | Nakagawa | ......... | G03G 15/5079 358/1.14 |
| 2008/0130042 A1 * | 6/2008 | Iizuka | ........... | G06F 21/608 358/1.15 |
| 2009/0059262 A1 * | 3/2009 | Takuwa | ............. | H04N 1/00496 358/1.13 |
| 2010/0027066 A1 * | 2/2010 | Nakai | ............... | H04N 1/00493 358/1.15 |
| 2010/0239307 A1 | 9/2010 | Onuma et al. | | |
| 2018/0189007 A1 * | 7/2018 | Akashi | ............... | G06F 3/1288 |

FOREIGN PATENT DOCUMENTS

JP          2010217474 A         9/2010

* cited by examiner

*Primary Examiner* — Allen H Nguyen
(74) *Attorney, Agent, or Firm* — Cantor Colburn LLP (57) ABSTRACT

Information processing equipment includes an image formation apparatus and a server device mutually integrated together. The server device includes a housing, a server main body unit provided inside the housing, a fan which generates an air stream flowing from outside the housing toward inside the housing and supplies the air stream to the server main body unit to cool the server main body unit, and a filter disposed at a position upstream of the server main body unit in a direction in which the air stream flows. The image formation apparatus or the server device is provided with a control unit restricting an operation of at least one of the image formation apparatus and the fan when the server device undergoes maintenance and inspection.

10 Claims, 8 Drawing Sheets

INFORMATION PROCESSING EQUIPMENT

CROSS-REFERENCE TO RELATED APPLICATIONS

The present invention claims priority under 35 U.S.C. § 119 to Japanese Patent Application No. 2017-054346, filed on Mar. 21, 2017, the entire disclosure of which are incorporated herein by reference.

TECHNOLOGICAL FIELD

The present invention relates to information processing equipment including a server device and an image formation apparatus integrated together.

DESCRIPTION OF THE RELATED ART

An image formation apparatus includes an image forming unit forming a toner image on a recording medium, a fixing unit fixing the toner image on the recording medium, and the like. Generally, such an image formation apparatus is connected via a network to a server device (a printer server) provided outside the image formation apparatus, and prints image data received through the server device.

Although being in a technical field different than a server device, Japanese Laid-Open Patent Publication No. 2010-217474 discloses an image formation apparatus comprising an interlock device. This image formation apparatus comprises an opening and closing cover, and depending on whether the cover is opened/closed, a power supply switch is set to ON or OFF.

SUMMARY

An image formation apparatus is mainly used to print on a recording medium data created by using a computer, read content of an original on which an image is previously formed and copy the content on a recording medium, etc. In many offices and the like, not only an image formation apparatus but a server device as described above is also installed.

Normally, the server device is connected to a client device via a network and performs a process based on a predetermined computer program in response to a request received from the client device. The server device functions as, for example, a mail server, a web server, an application server, a file server, a print server, etc. The server device may also be connected to an external network such as the Internet. The server device may also push data processed inside the server device, regardless of whether or not there is a request from the client device.

While the server device can be used for various purposes such as storing, organizing, or processing data etc, it is intensively responsible for a particular role, and accordingly, internally, easily generates heat. In order to prevent the server device from having a reduced operation processing ability and prevent a variety of devices internal to the server device from having a reduced lifetime, etc., a fan or the like is generally installed in the server device to supply an air stream to a server main body unit through a filter to cool the server main body unit.

When the server device undergoes maintenance and inspection, a door composing the server device is opened for example. In this state, maintenance personnel perform necessary operations such as partially or entirely replacing the server main body unit with another, cleaning the server main body unit, etc. Conventionally, an image formation apparatus and a server device have been separately installed at separate places, and fine paper dust generated from the image formation apparatus, dust accumulated around the image formation apparatus, etc. substantially do not enter the server device.

However, when information processing equipment including a server device and an image formation apparatus integrated together has the server device's door opened for maintenance and inspection, fine paper dust generated from the image formation apparatus, dust accumulated around the image formation apparatus, etc. may enter the server device.

The present invention has been made in view of the above circumstances, and contemplates information processing equipment including a server device and an image formation apparatus integrated together, that has a configuration capable of suppressing introduction of paper dust, dust and the like into the server device when maintenance and inspection are conducted.

To achieve at least one of the abovementioned objects, according to an aspect of the present invention, information processing equipment reflecting one aspect of the present invention comprises: an image formation apparatus which forms an image on a recording medium; and a server device integrated with the image formation apparatus, connected to a network and performing a prescribed process, the server device including a housing, a server main body unit provided inside the housing, a fan which generates an air stream flowing from outside the housing toward inside the housing and thus supplies the air stream to the server main body unit to cool the server main body unit, and a filter disposed at a position upstream of the server main body unit in a direction in which the air stream flows, and removing dust contained in the air stream supplied to the server main body unit, the image formation apparatus or the server device being provided with a control unit restricting an operation of at least one of the image formation apparatus and the fan when the server device undergoes maintenance and inspection.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

(Information Processing Equipment 100)

Figure 1:
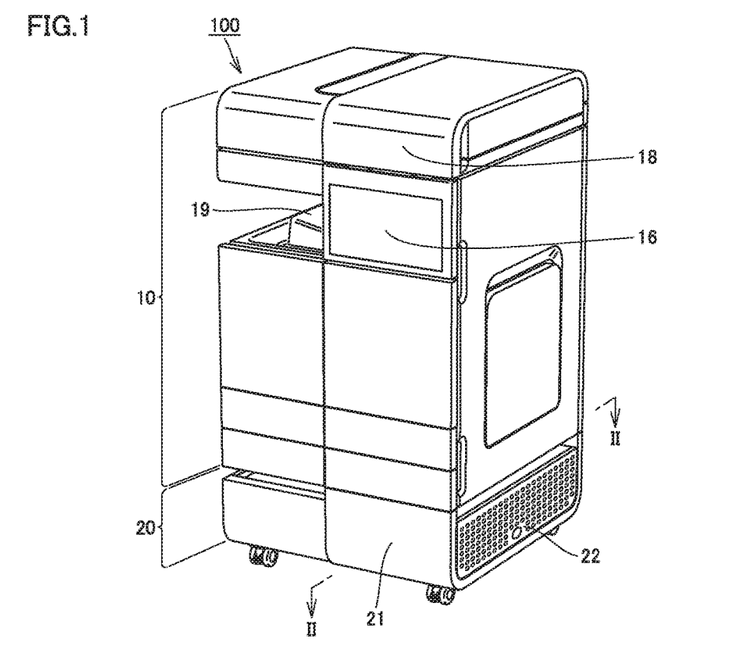
FIG. 1 is a perspective view showing information processing equipment 100 according to an embodiment.
Figure 2:
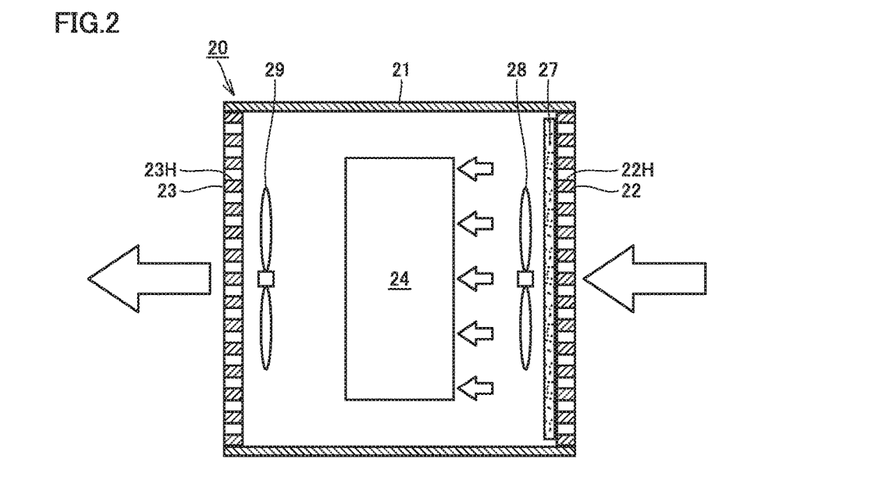
FIG. 2 is a cross sectional view taken along an arrowed line II-II shown in FIG. 1, and seen in the direction of the arrow.
Figure 3:
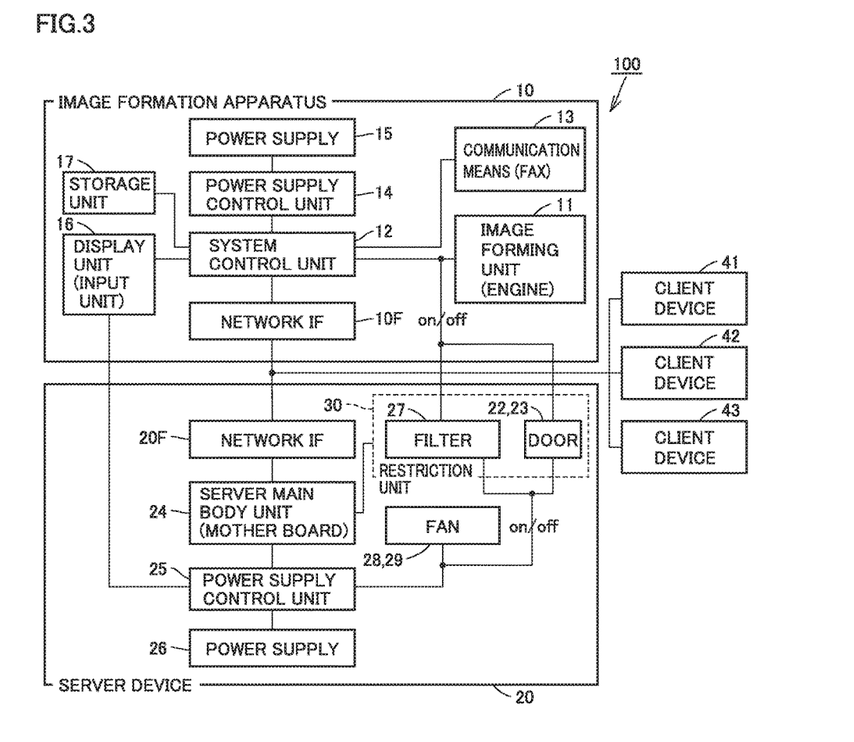
FIG. 3 is a diagram showing a functional block of information processing equipment 100 according to the embodiment.

FIG. 1 is a perspective view showing information processing equipment 100 according to an embodiment. FIG. 2 is a cross sectional view taken along an arrowed line II-II shown in FIG. 1, and seen in the direction of the arrow. FIG. 3 is a diagram showing a functional block of information processing equipment 100 according to the embodiment.

As shown in FIG. 1 to FIG. 3, information processing equipment 100 includes an image formation apparatus 10 and a server device 20. The housing of image formation apparatus 10 is integrated with the housing of server device 20, and in the present embodiment, disposed over server device 20.

(Image Formation Apparatus 10)

Mainly referring to FIG. 3, image formation apparatus 10 includes, as its constituent elements, an image forming unit 11 forming an image on a recording medium, a system control unit 12 (a control unit) generally controlling image formation apparatus 10, a communication means 13 such as a facsimile, a power supply control unit 14, a power supply 15, a display unit 16 (an input unit) composed of a touch panel, etc., a storage unit 17, a network IF 10F, an image reading device 18 (see FIG. 1), a sheet discharging unit 19 (see FIG. 1) and the like.

Electric power from a commercial power supply or the like is supplied from power supply 15 via power supply control unit 14 to a variety of devices constituting image formation apparatus 10. System control unit 12 is composed of a CPU (Central Processing Unit) and the like. System control unit 12 is connected to client devices 41, 42, 43, etc. via network interface (IF) 10F and a network such as a LAN (Local Area Network), etc. System control unit 12 may also be connected to an external network such as the Internet.

System control unit 12 can also be connected to a server main body unit 24 (a control unit) via network IF 10F and a network IF 20F provided to server device 20. Image formation apparatus 10 according to the present embodiment alone has a variety of functions such as a file management function, an image communication function, a copying function, a printing function, and the like, and can perform a variety of processes based on an instruction received by system control unit 12 from client devices 41, 42, 43 to perform the processes.

Image formation apparatus 10 can also receive an instruction from a user via display unit 16 (a touch panel) to perform a variety of operations such as printing and reading an image. Image formation apparatus 10 may be configured to communicate with server device 20 image data, a value relating to temperature information of server main body unit 24 (e.g., a CPU load), data relating to an operation of image formation apparatus 10, etc.

For example, when system control unit 12 receives a print job from client devices 41, 42, 43 or the like, system control unit 12 transmits a print instruction to a variety of devices constituting image formation apparatus 10. Upon receiving the print instruction from system control unit 12, image forming unit 11 forms a toner image on a recording medium, and the fixing device (not shown) fixes the toner image on the recording medium.

While information processing equipment 100 according to the present embodiment has a configuration in which a single image formation apparatus 10 can be shared by a plurality of client devices 41, 42, 43 and the like, there may also be a case where there is only a single client device. Furthermore, it can also be configured to allow an external client device to access image formation apparatus 10 not only through a wired LAN but also through a wireless LAN.

(Server Device 20)

With reference to FIG. 2 and FIG. 3, server device 20 includes a housing 21, doors 22 and 23, server main body unit 24, a power supply control unit 25, a power supply 26, a filter 27, fans 28 and 29, and a restriction unit 30. Housing 21 has a pair of openings located on opposite sides and doors 22 and 23 are disposed to be capable of opening and closing these openings.

Doors 22 and 23 may be attached to and detached from housing 21 to close and open the openings of housing 21 or may pivot about a hinge to do so. Doors 22 and 23 can be used for subjecting server main body unit 24 to maintenance and inspection. Maintenance personnel for example open door 22 or door 23, and in that condition, can partially or entirely replace server main body unit 24 with another.

Inside housing 21, server main body unit 24, filter 27, fans 28, 29, etc. are disposed. Electric power from a commercial power supply or the like is supplied from power supply 26 via power supply control unit 25 to a variety of devices constituting server device 20. Server main body unit 24 is constantly in operation to perform a variety of processes for client devices 41 to 43. Server main body unit 24 is composed of a mother board, a CPU, a variety of recording devices (a HDD, an SSD, etc.), a heat sink, etc.

Server main body unit 24 is connected to client devices 41, 42, 43, etc. via network IF 20F and a network such as a LAN. Server device 20 according to the present embodiment alone functions as a mail server, a web server, an application server, a file server, a print server, and the like, and in response to a request received from client devices 41, 42, 43 or the like, server main body unit 24 can perform a prescribed process (e.g., storage of data, organization of data, a variety of types of dynamic processing, a variety of types of responsive processing, and the like) based on a predetermined computer program. Server main body unit 24 may also be connected to an external network such as the Internet. In some cases, regardless of whether there is a request received from client devices 41, 42, 43, server main body unit 24 may push data of a predetermined process performed inside server main body unit 24 as a processing result.

Fans 28 and 29 fed with power from power supply 26 via power supply control unit 25 are driven to generate an air stream flowing from outside of housing 21 toward inside of housing 21 (as indicated in FIG. 2 by an open arrow). By supplying this air stream to the CPU, variety of recording devices, heat sink, etc., of server main body unit 24, these components can be cooled.

In the present embodiment, a plurality of introduction ports 22H are formed through door 22, and a plurality of discharge ports 23H are formed through door 23. As fans 28 and 29 rotate, air outside housing 21 is introduced into housing 21 through introduction port 22H, and air inside housing 21 is discharged to outside of housing 21 through discharge port 23H.

In the present embodiment, filter 27 is disposed at a position upstream of server main body unit 24 in a direction in which such an air stream as described above flows so as to close introduction port 22H. Filter 27 removes dust contained in the air stream before the air stream is supplied to server main body unit 24. By a dust collecting function of filter 27, a clean air stream can be blown to server main body unit 24 as a cooling means.

(Control Unit)

When a control unit provided to image formation apparatus 10 or server device 20 determines that server device 20 undergoes maintenance and inspection, the control unit applies control to restrict both an operation of image formation apparatus 10 and those of fans 28 and 29, as will be described below.

Figure 4:
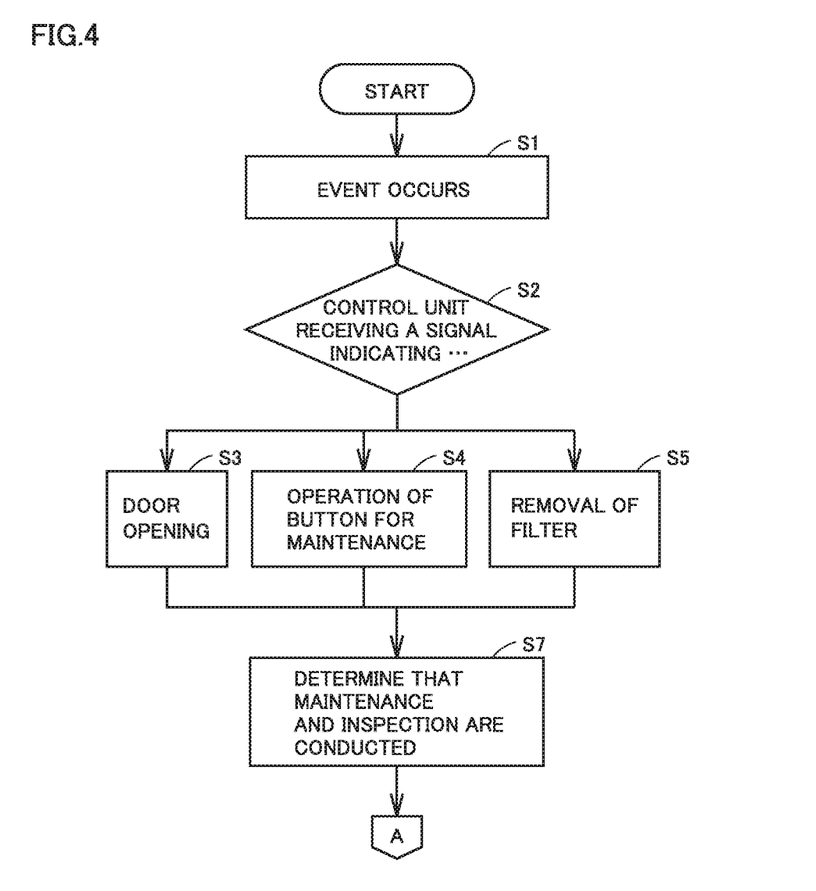
FIG. 4 is a first diagram showing a flow of control performed by a control unit provided in an image formation apparatus 10 and a server device 20 according to the embodiment.
Figure 5:
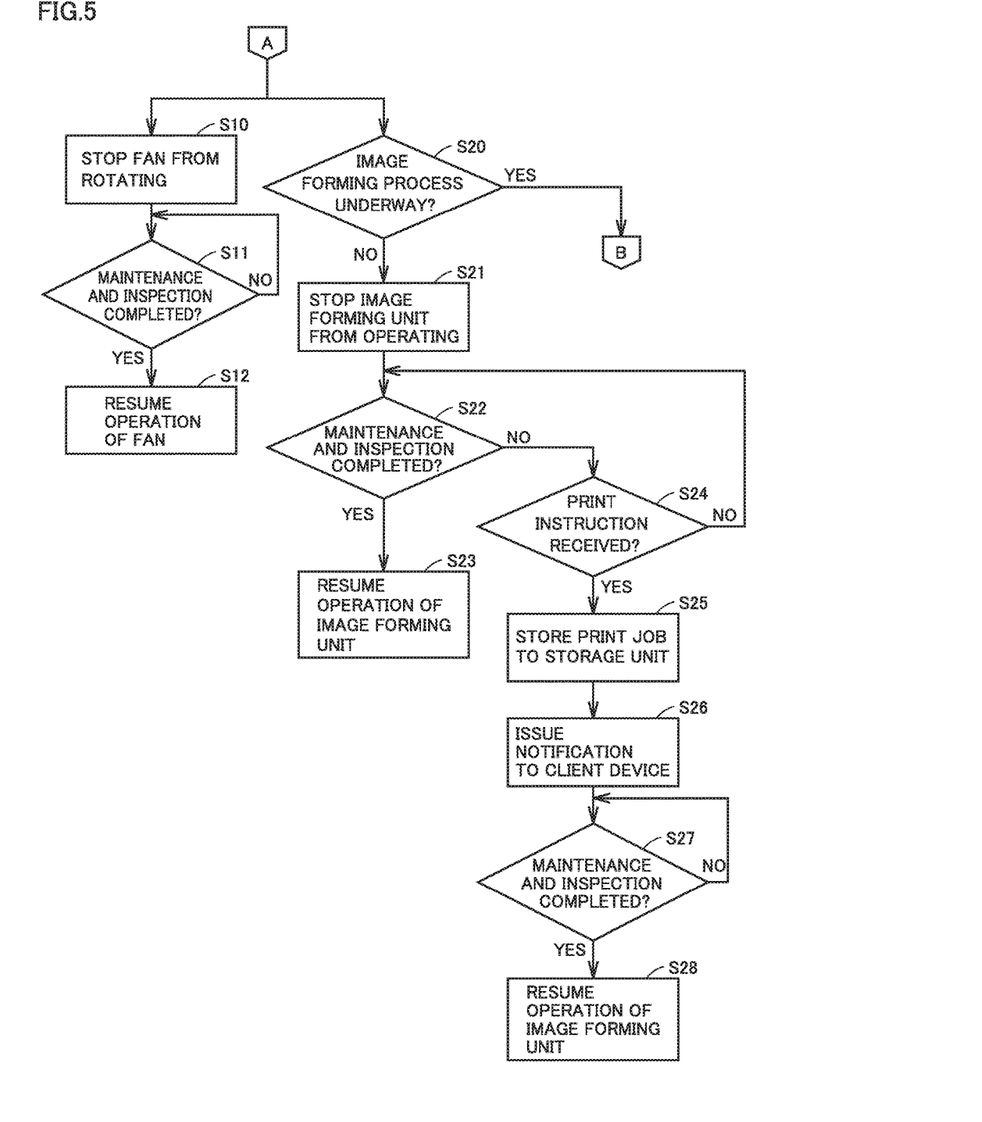
FIG. 5 is a second diagram showing a flow of control performed by the control unit provided in image formation apparatus 10 and server device 20 according to the embodiment.
Figure 6:
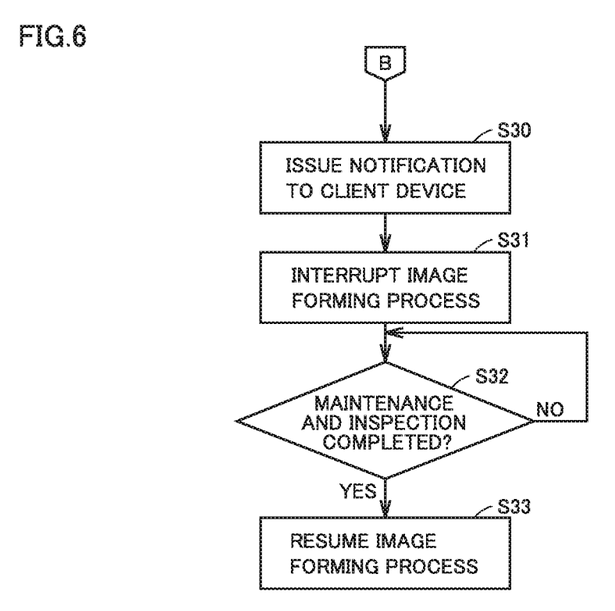
FIG. 6 is a third diagram showing a flow of control performed by the control unit provided in image formation apparatus 10 and server device 20 according to the embodiment.

FIG. 4 to FIG. 6 are diagrams showing a flow of control performed by a control unit provided to image formation apparatus 10 and server device 20. As shown in FIG. 4, the control unit that performs such control as described above receives a signal when some event occurs (S1, S2), and if it corresponds to any one of S3 to S5, the control unit determines that maintenance and inspection are conducted (S7).

For example, the control unit receives a signal from a sensor that detects that at least one of door 22 and door 23 is opened (S1 to S3 in FIG. 4), and, based on that signal, the control unit determines that maintenance and inspection are conducted for server device 20 (S7). The control unit can easily determine, based on door 22 and door 23 being opened/closed, that server device 20 undergoes maintenance and inspection.

As shown in FIG. 5, when server device 20 undergoes maintenance and inspection, the control unit stops fans 28 and 29 from rotating (S10). The control unit may reduce a rotation speed of fans 28 and 29. This can suppress introduction of paper dust, dust and the like into server device 20 when server device 20 undergoes maintenance and inspection.

When server device 20 is disposed under image formation apparatus 10, server device 20 will be located under a sheet passing path (a sheet transporting roller), a manual sheet feeding unit, etc., and paper dust easily falls around server device 20 through a wiring hole and the like. The above described control done by the control unit can suppress introduction of paper dust, dust and the like into server device 20 when server device 20 undergoes maintenance and inspection. Thereafter, the control unit receives a signal indicating that door 22 and door 23 are both closed, and accordingly, determines that maintenance and inspection of server device 20 have been completed (YES in S11) and resumes an operation of fans 28 and 29 (S12).

As shown in S20 of FIG. 5, when the control unit determines that server device 20 undergoes maintenance and inspection, and at that point in time, an image forming process is not underway (NO in S20), image forming unit 11 of image formation apparatus 10 is also stopped from operating (S21). Specifically, after server main body unit 24 (the control unit) determines that server device 20 undergoes maintenance and inspection, server main body unit 24 sends a command signal to system control unit 12 (the control unit). System control unit 12 receives the signal, and when image forming unit 11 is not performing an image forming process, system control unit 12 stops image forming unit 11 of image formation apparatus 10 from operating. When image forming unit 11 is in operation, a variety of devices in image formation apparatus 10 vibrate, and thereby, paper dust and the like may be scattered from a paper feeding cassette or the like. Stopping image forming unit 11 from operating can suppress introduction of paper dust and the like into server device 20 when server device 20 undergoes maintenance and inspection. When system control unit 12 receives a signal from server main body unit 24 indicating that the maintenance and inspection have been completed (YES in S22), an operation of image forming unit 11 is resumed (S23).

As indicated in FIG. 5 by S20 and a connection B, and in FIG. 6, when the control unit determines that server device 20 undergoes maintenance and inspection, and at that point in time, an image forming process is underway (for example, continuous printing is underway), system control unit 12 having received a signal from server main body unit 24 notifies a client device that the image forming process by image formation apparatus 10 is interrupted (for example, a print instruction from the client device is suspended, a process is interrupted, delayed, etc.) (S30). System control unit 12 may not only notify the client device, but may also transmit a signal to a notification unit (e.g., display unit 16) of image formation apparatus 10 for indicating information regarding the fact that an image forming operation is restricted. A user has instructed image formation apparatus 10 of information processing equipment 100 to perform an image forming operation. Informing the user that information processing equipment 100 is currently not performing an image forming operation, allows information processing equipment 100 to be more conveniently used.

In addition to the notification, system control unit 12 interrupts the image forming process performed by image forming unit 11 of image formation apparatus 10 (S31). Until server main body unit 24 determines that maintenance and inspection are no longer conducted (for example, that detection information indicating that door 22 and door 23 are closed is received, that is, that YES is indicated in S32), resumption of an image forming process by image formation apparatus 10 is delayed. When server main body unit 24 obtains the detection information that door 22 and door 23 are closed and server main body unit 24 determines that maintenance and inspection are no longer conducted (YES in S32), server main body unit 24 transmits a command signal to system control unit 12 of image formation apparatus 10, and system control unit 12 receives the signal, and resumes an image forming process by image forming unit 11 (S33). Since image forming unit 11 does not operate with door 22 and door 23 being open, introduction of paper dust and the like into server device 20 can more effectively be suppressed.

As indicated in FIG. 5 by S24 and S25, system control unit 12 may receive a print instruction while maintenance and inspection are being conducted. In this case, storage unit 17 (FIG. 3) provided to image formation apparatus 10 temporarily stores the print instruction (e.g., a print job received from client devices 41 to 43, communication means 13 (a fax), etc.). Similarly, when display unit 16 (a touch panel) is configured to be operable even when maintenance and inspection are conducted, storage unit 17 temporarily stores a printing operation etc. accepted via display unit 16 (the touch panel) during maintenance and inspection. System control unit 12 notifies a client device that has transmitted a print instruction (or display unit 16) that printing is suspended (S26). Once maintenance and inspection have been completed, printing is immediately performed, (S27, S28), and information processing equipment 100 can thus be used more conveniently.

As a control unit that performs such an operation as described above, system control unit 12 (see FIG. 3) is used for example when image formation apparatus 10 is in operation. In order to make it possible to determine, even when image formation apparatus 10 is powered off (or when image formation apparatus 10 is not in operation), that server device 20 undergoes maintenance and inspection, a control unit capable of functioning even when image formation apparatus 10 is powered off is provided in image formation apparatus 10 separately from system control unit 12.

As a control unit that performs such an operation as described above, server main body unit 24 of server device 20 is also used regardless of whether image formation apparatus 10 is in operation. Server main body unit 24 may be removed from server device 20 through maintenance and inspection. In order to make it possible to determine, even when server main body unit 24 is removed from server device 20, that server device 20 is continuously undergoing maintenance and inspection a control unit capable of functioning even when server main body unit 24 is removed from server device 20 is provided in server device 20 separately from server main body unit 24.

Restriction unit 30 (see FIG. 3) provided to server device 20 is configured to restrain maintenance personnel, a user or the like from conducting maintenance and inspection (in this case, opening doors 22 and 23). For example, restriction unit 30 functions as a locking mechanism, and when the control unit provided in server device 20 determines that server main body unit 24 has a processing load (e.g., a CPU load) equal to or larger than a predetermined value, the control unit restricts via restriction unit 30 opening doors 22 and 23. This restricting operation is performed as a flow in a step before an event occurs S1 shown in FIG. 4. It is not until fans 28 and 29 operate to allow server main body unit 24 to have a processing load less than the predetermined value that maintenance and inspection are allowed to be conducted (for example, an event of opening doors 22 and 23 is allowed to occur), which can prevent a reduced lifetime attributed to heat generated by a variety of devices internal to the server device. When the control unit determines that server main body unit 24 has a processing load (e.g., a CPU load) less than the predetermined value, the control unit controls restriction unit 30 to remove restriction.

Regarding S4 shown in FIG. 4, display unit 16 (a touch panel) of image formation apparatus 10 is provided with a button provided for maintenance. The button allows a user to set for image formation apparatus 10 that image formation apparatus 10 shifts to a maintenance and inspection mode. Display unit 16 functions as an input unit, and system control unit 12 (a control unit) provided to image formation apparatus 10 can determine based on an instruction input to the input unit by a user whether server device 20 undergoes maintenance and inspection (S7).

In the above-described embodiment, when the control unit provided to image formation apparatus 10 or server device 20 determines that server device 20 undergoes maintenance and inspection, the control unit restricts both an operation of image formation apparatus 10 and those of fans 28 and 29. This configuration is not exclusive, and when the control unit provided to image formation apparatus 10 or server device 20 determines that server device 20 undergoes maintenance and inspection, the control unit may apply such control as described above to restrict an operation of at least one of image formation apparatus 10 and fans 28 and 29.

First Exemplary Variation

Figure 7:
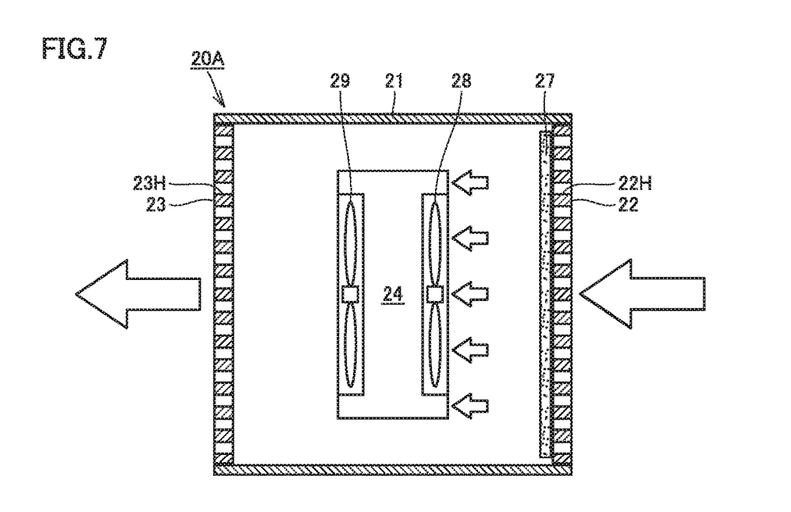
FIG. 7 is a cross-sectional view showing a server device 20A according to a first exemplary variation of the embodiment.

FIG. 7 is a cross-sectional view showing a server device 20A according to a first exemplary variation of the embodiment. In the embodiment described above (see FIG. 2), fan 28 is disposed upstream of server main body unit 24, and fan 29 is disposed downstream of server main body unit 24.

As shown in FIG. 7, fans 28 and 29 may be integrated with server main body unit 24 upstream and downstream of server main body unit 24. This configuration is not exclusive, and fans 28 and 29 used for the server device of the information processing equipment may be provided outside housing 21 of the server device (for example, on an external wall surface), or only one of fans 28, 29 may be used for server device 20 or three or more fans may be used.

Second Exemplary Variation

Figure 8:
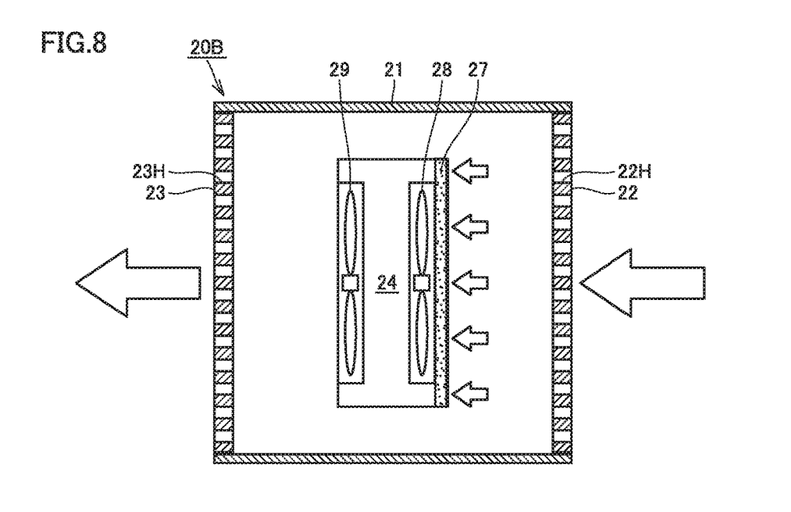
FIG. 8 is a cross-sectional view showing a server device 20B according to a second exemplary variation of the embodiment.

FIG. 8 is a cross-sectional view showing a server device 20B according to a second exemplary variation of the embodiment. In the embodiment described above (see FIG. 2), filter 27 is located upstream of server main body unit 24 and disposed to close a plurality of introduction ports 22H provided through door 22.

As shown in FIG. 8, filter 27 may be integrated with server main body unit 24 upstream of server main body unit 24. Filter 27 may be integrated with server main body unit 24 in order to be disposed inside housing 21 and be removed to outside housing 21.

This configuration is not exclusive, and for example, filter 27 may be disposed on an external wall surface of door 22. In such a case, filter 27 can be replaced without opening door 22, which is convenient. In that case, server main body unit 24 (a control unit) provided to server device 20 may determine whether the server device undergoes maintenance and inspection, based on whether filter 27 is located at a predetermined position upstream of server main body unit 24.

Regarding S5 shown in FIG. 4, when the control unit for example receives a signal from a sensor detecting that filter 27 is removed from an external wall surface of door 22, the control unit determines that server device 20 undergoes maintenance and inspection. When filter 27 is removed, the control unit stops fans 28 and 29 from rotating or reduces their rotation speed, restricts an operation of image forming unit 11 of image formation apparatus 10, etc. This configuration can also suppress introduction of paper dust, dust and the like into server device 20 when server device 20 undergoes maintenance and inspection.

Referring again to FIG. 3, when filter 27 is configured to be removable from the external wall surface of door 22, restriction unit 30 may be configured to restrain maintenance personnel, a user or the like from conducting maintenance and inspection (herein, removing filter 27). For example, restriction unit 30 functions as a locking mechanism, and when server main body unit 24 (a control unit) provided to server device 20 determines that server main body unit 24 has a processing load (e.g., a CPU load) equal to or larger than a predetermined value, the control unit restricts via restriction unit 30 removing filter 27. This restricting operation is performed as a flow in a step before an event occurs S1 shown in FIG. 4. It is not until fans 28 and 29 operate to allow server main body unit 24 to have a processing load less than the predetermined value that maintenance and inspection are allowed to be conducted, which can prevent a reduced lifetime attributed to heat generated by a variety of devices internal to the server device.

Third Exemplary Variation

In the above embodiment and the first and second exemplary variations, server main body unit 24 is disposed inside housing 21, and through door 22 or 23 server main body unit 24 is disposed inside housing 21 or removed from inside housing 21.

This configuration is not exclusive, and an opening may be formed to penetrate a portion of a side wall of housing 21 and server main body unit 24 may be disposed so as to close the opening. In a case where server main body unit 24 is configured to be capable of being inserted and extracted through this opening formed through housing 21, server main body unit 24 can be replaced with another or the like even if doors 22 and 23 are not provided to housing 21.

In a case where server main body unit 24 is disposed so as to close an opening provided through a sidewall of housing 21, the control unit provided to server device 20 may determine, based on whether server main body unit 24 is inserted into housing 21 (or the opening), whether the server device undergoes maintenance and inspection. In this case also, in order to make it possible to determine, even when server main body unit 24 is removed from server device 20, that server device 20 undergoes maintenance and inspection, a control unit capable of functioning even when server main body unit 24 is removed from server device 20 is provided in server device 20 separately from server main body unit 24.

Restriction unit 30 (see FIG. 3) may be configured to restrain maintenance personnel, a user or the like from conducting maintenance and inspection (in this case, extracting server main body unit 24 from housing 21). For example, restriction unit 30 functions as a locking mechanism, and when server main body unit 24 (a control unit) provided to server device 20 determines that server main body unit 24 has a processing load (e.g., a CPU load) equal to or larger than a predetermined value, the control unit may restrict via restriction unit 30 extracting server main body unit 24 from housing 21. This restricting operation is performed as a flow in a step before an event occurs S1 shown in FIG. 4. This can prevent server main body unit 24 from being disconnected from other devices when server main body unit 24 is accessed for data.

Fourth Exemplary Variation

Figure 9:
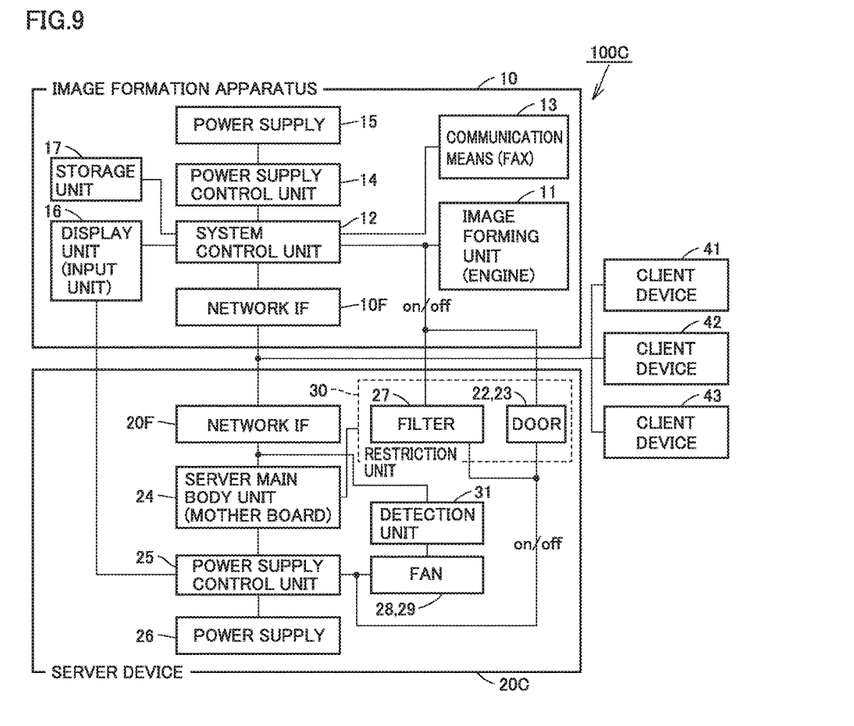
FIG. 9 is a diagram showing a functional block of information processing equipment 100C including a server device 20C according to a fourth modification of the embodiment.
Figure 10:
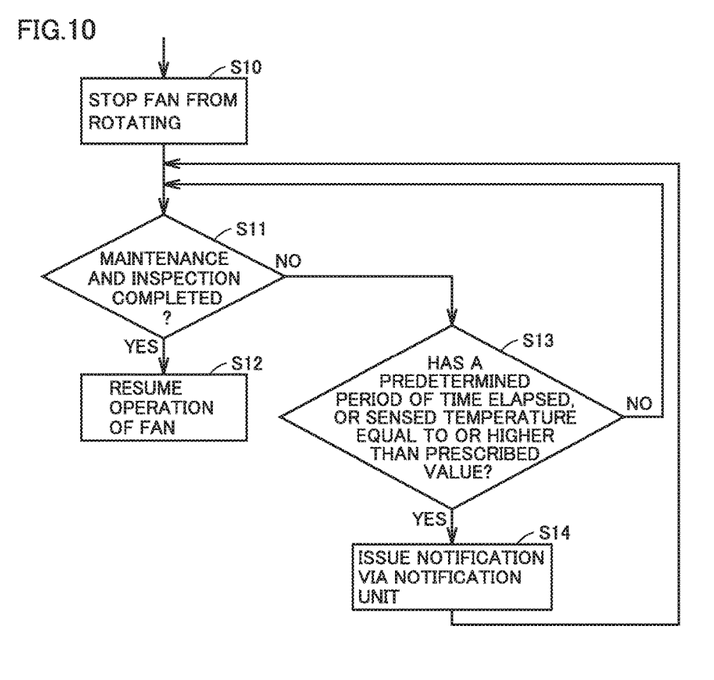
FIG. 10 is a diagram showing a control flow for the fourth exemplary variation of the embodiment.

FIG. 9 is a diagram showing a functional block of information processing equipment 100C including a server device 20C according to a fourth exemplary variation of the embodiment. FIG. 10 is a diagram showing a control flow for the fourth exemplary variation. An operation of fans 28 and 29 is restricted (e.g., stopped) in S10 and thereafter once a predetermined period of time has elapsed (YES in S13), server main body unit 24 (a control unit) provided to server device 20 receives a signal from detection unit 31 (a timer means or the like) indicating that the predetermined period of time has elapsed, and server main body unit 24 outputs a signal to a notification unit (display unit 16) of image formation apparatus 10 and/or a client device (S14) for notification accordingly. The notification unit notifies a user, maintenance personnel or the like that fans 28 and 29 are stopped for a long period of time, which can prevent server main body unit 24 from having temperature excessively increased as an operation of fans 28 and 29 is restricted for a long period of time.

A configuration may be made to be capable of sensing the temperature of the CPU incorporated in server main body unit 24, and the control unit provided in image formation apparatus 10 and/or server device 20 may output a signal to the notification unit (display unit 16) of image formation apparatus 10 and/or a client device for indicating that the sensed temperature is equal to or higher than a predetermined value (YES in S13) (S14). This configuration can also prevent server main body unit 24 from having excessively increased temperature.

Although embodiments of the present invention have been described and illustrated in detail, the disclosed embodiments are made for purposes of illustration and example only and not limitation. The scope of the present invention should be interpreted by terms of the appended claims.

What is claimed is:
1. Information processing equipment comprising:
an image formation apparatus which forms an image on a recording medium; and
a server device integrated with the image formation apparatus, connected to a network and performing a prescribed process, the server device including
a housing,
a server main body unit provided inside the housing,
a fan which generates an air stream flowing from outside the housing toward inside the housing and thus supplies the air stream to the server main body unit to cool the server main body unit, and
a filter disposed at a position upstream of the server main body unit in a direction in which the air stream flows, and removing dust contained in the air stream supplied to the server main body unit,
the image formation apparatus or the server device being provided with a control unit restricting an operation of at least one of the image formation apparatus and the fan when the server device undergoes maintenance and inspection.
2. The information processing equipment according to claim 1, wherein
the housing includes a door that can be opened and closed, and
the control unit restricts the operation of at least one of the image formation apparatus and the fan, based on whether the door is opened/closed.
3. The information processing equipment according to claim 1, wherein the control unit determines, based on whether the filter is located at the position upstream of the server main body unit, whether the server device undergoes the maintenance and inspection.
4. The information processing equipment according to claim 1, wherein
the server main body unit is configured to be capable of being inserted into and extracted from the housing, and
the control unit determines, based on whether the server main body unit is inserted into the housing, whether the server device undergoes the maintenance and inspection.
5. The information processing equipment according to claim 1, further comprising an input unit, wherein the control unit determines, based on an instruction input to the input unit, whether the server device undergoes the maintenance and inspection.

6. The information processing equipment according to claim 1, wherein when the control unit determines that while the image formation apparatus performs an image forming process the server device undergoes the maintenance and inspection, the control unit interrupts the image forming process performed by the image formation apparatus, and until the control unit determines that the server device no longer undergoes the maintenance and inspection, the control unit delays resumption of the image forming process performed by the image formation apparatus.

7. The information processing equipment according to claim 1, wherein the control unit outputs a signal to a notification unit of the image formation apparatus and/or a client device connected to the server device for indicating information on that the operation of the image formation apparatus is restricted.

8. The information processing equipment according to claim 1, further comprising a storage unit which stores an instruction received by the image formation apparatus when the server device undergoes the maintenance and inspection.

9. The information processing equipment according to claim 1, further comprising a restriction unit, wherein when the control unit determines that the server main body unit has a processing load equal to or larger than a predetermined value, the control unit restricts via the restriction unit conducting the maintenance and inspection.

10. The information processing equipment according to claim 1, wherein the control unit outputs a signal to a notification unit of the image formation apparatus and/or a client device connected to the server device for indicating that a prescribed period of time has elapsed since the operation of the fan was restricted.

* * * * *